United States Patent [19]
Bombarda et al.

[11] Patent Number: 5,427,081
[45] Date of Patent: Jun. 27, 1995

[54] INTERNAL COMBUSTION ENGINE AIR INTAKE REGULATING SYSTEM

[75] Inventors: Giorgio Bombarda; Gabriele Serra, both of S. Lazzaro Di Savena, Italy

[73] Assignee: Weber S.r.l., Turin, Italy

[21] Appl. No.: 259,545

[22] Filed: Jun. 14, 1994

[30] Foreign Application Priority Data

Jun. 16, 1993 [IT] Italy .................. BO93A0272

[51] Int. Cl.⁶ .............................................. F02B 23/00
[52] U.S. Cl. ...................................... 123/585; 123/587
[58] Field of Search .................... 123/339, 585, 587

[56] References Cited

U.S. PATENT DOCUMENTS

| | | | |
|---|---|---|---|
| 4,538,578 | 9/1985 | Suzuki et al. .................. | 123/585 |
| 4,856,475 | 8/1989 | Shimomura .................. | 123/339 |

FOREIGN PATENT DOCUMENTS

| | | |
|---|---|---|
| 0212092 | 3/1987 | European Pat. Off. . |
| 59-046351 | 3/1984 | Japan . |
| 2128779 | 5/1982 | United Kingdom . |
| WO90/07052 | 6/1990 | WIPO . |
| WO92/08045 | 5/1992 | WIPO . |

*Primary Examiner*—Noah P. Kamen
*Attorney, Agent, or Firm*—Baker & Daniels

[57] ABSTRACT

The present invention involves an air regulation system for an internal combustion engine. The system comprises an air intake manifold, in turn presenting a main conduit with a throttle valve, and a bypass conduit with a regulating valve. An inlet and outlet are defined along the main conduit respectively upstream and downstream from the throttle valve. The system includes a device for controlling the regulating valve and sensors for detecting the speed and air intake of the engine. A processor determines the regulating valve control signal on the basis of engine speed. The processor then calculates the theoretical position of the regulating valve on the basis of engine speed and load. The processor calculates the estimated post-control position of the regulating valve on the basis of the readings of the sensors and compares the theoretical and estimated positions to generate an error signal. Finally, the processor varies the regulating valve control signal on the basis of the error signal.

6 Claims, 2 Drawing Sheets

INTERNAL COMBUSTION ENGINE AIR INTAKE REGULATING SYSTEM

BACKGROUND OF THE INVENTION

The present invention relates to an internal combustion engine air intake regulating system.

As is known, motor vehicles feature an air intake manifold fitted with an air supply regulating valve—generally a throttle valve—at which is formed a bypass conduit for additional air, and the angular position of which is user-controlled either directly (accelerator pedal) or indirectly (electronic control system activated by the accelerator pedal). The bypass conduit is in turn fitted with a second valve for regulating air supply to the engine independently off the user, and which is particularly useful for supplying the engine with additional air at idling speed, startup, or when the vehicle is "braked" by the engine upon release of the accelerator pedal ("dashpot" conditions).

Known engine air intake regulating systems provide for feedback control of the air supply along the intake manifold, i.e. for continuously detecting air supply due to the angular position of the throttle, by detecting either the air pressure along the intake manifold, or the electrical resistance of a potentiometer, which is closely related to the angular position of the throttle. In most known systems, no feedback control is provided of the air supply along the bypass conduit, so that no information relative to performance and the efficiency of the adjustment effected along the bypass is supplied to the system controlling the second valve. For example, in the case of known systems featuring a step motor for controlling the second valve, air supply can only be determined by the control system on the basis of the steps commanded by it to the step motor. As step motors, however, are known, under certain conditions, to "fall out of step", thus resulting in a discrepancy —"undetected" by the control system—between the number of steps commanded and those actually performed, and since the additional air supply parameter serves for processing further engine control data, any computing errors relative to additional air supply obviously result in data processing errors.

In certain engine air intake regulating systems, the additional air supply is feedback-controlled by detecting the electrical resistance of a potentiometer, which is closely related to the position of the second valve. Such systems, however, are expensive to produce, mainly due to the cost of the potentiometer, and the difficulties posed by suitably seating and assembling it.

SUMMARY OF THE INVENTION

It is an object of the present invention to provide an internal combustion engine air intake regulating system designed to overcome the aforementioned drawbacks.

According to the present invention, the internal combustion engine air intake regulating system comprises an air intake manifold, in turn presenting a main conduit, a first air supply regulating valve installed along the main conduit, a bypass conduit with an inlet and outlet defined along the main conduit and respectively upstream and downstream from the first valve, and a second air supply regulating valve installed along the bypass conduit, with a device for controlling the second valve. The system also includes sensor for detecting the speed of the engine and a second sensor for detecting air intake by the engine. A processor is used for processing the control signal of the second valve as a function of engine speed.

The processor also processes and stores the theoretical position of the second valve as a function of engine speed.

The processor further processes and stores the position of the second valve following performance of a command of the control signal, which position is estimated on the basis of the readings of the first and second sensor.

The processor compares the theoretical position and the estimated position, and thereby generates an error signal.

The processor varies the control signal of the second valve as a function of the error signal.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
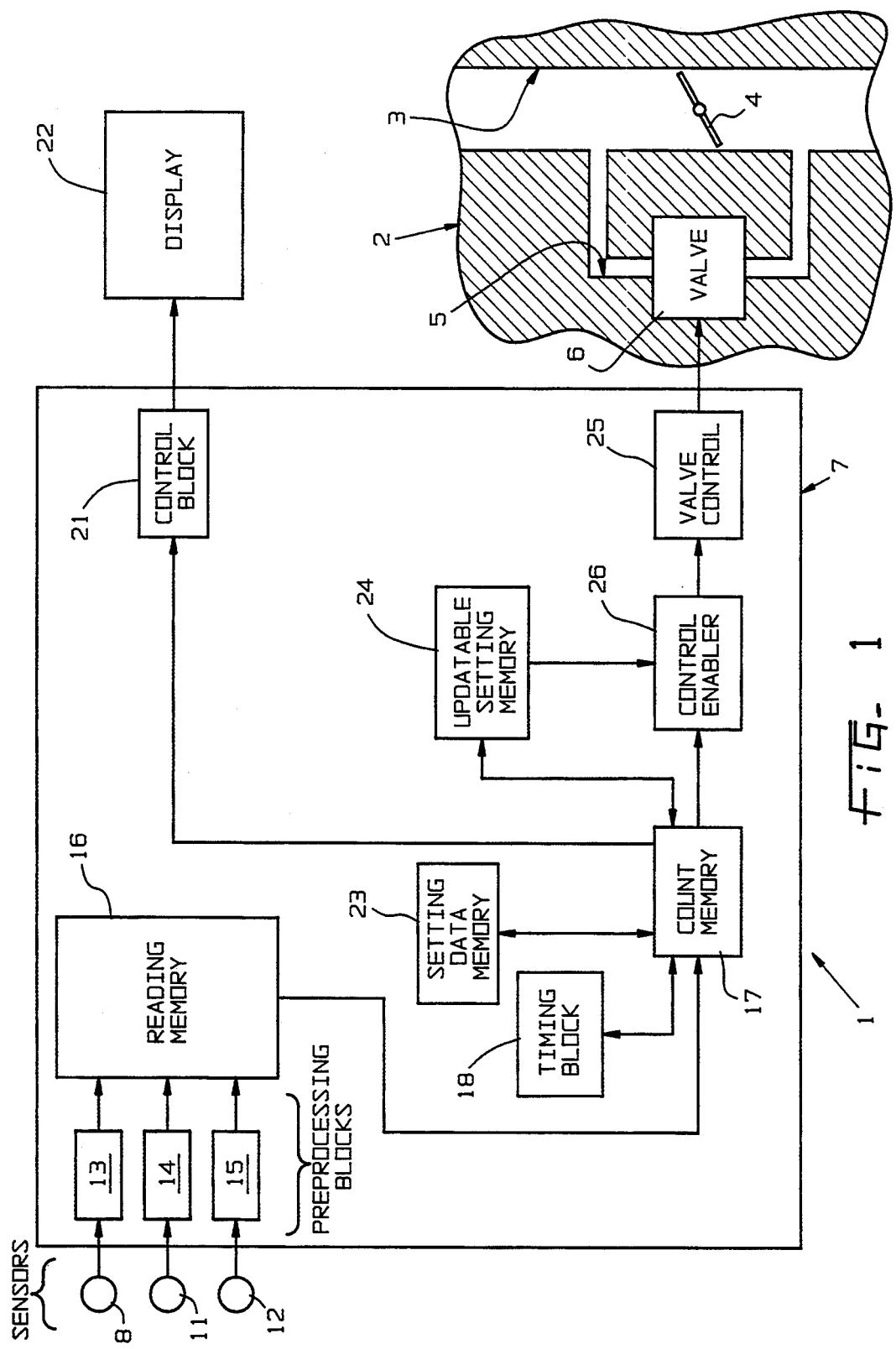
FIG. 1 shows a partial section and block diagram of an internal combustion engine air intake regulating system in accordance with the teachings of the present invention.

Number 1 in FIG. 1 indicates a system for regulating the air intake of an internal combustion engine (not shown). System 1 comprises an air intake manifold 2 in turn presenting a main conduit 3 fitted with an air supply regulating valve consisting, in the embodiment shown, of a throttle valve 4; and a bypass conduit 5, the inlet of which is defined along conduit 3, upstream from throttle 4, and the outlet of which is defined along conduit 3, downstream from throttle 4. Along conduit 5, provision is made for a known air supply regulating valve 6 shown only schematically, and by which is intended an assembly defined by an on/off member, and an actuating member by which the on/off member is operated. As an on/off member, valve 6 may comprise a throttle similar to 4, a gate valve or similar.

System 1 also comprises an electronic control system 7 for controlling valve 6 and to which are connected three sensors 8, 11 and 12 for respectively detecting engine speed, air supply to the engine, and the angular position of throttle 4. Sensor 11 may consist of means for detecting air supply along conduit 3 upstream from the inlet of conduit 5, or means for detecting air pressure and temperature along conduit 3 downstream from the outlet of conduit 5.

As is known, the angular position of throttle 4 is user-controlled either directly (accelerator pedal, not shown) or indirectly (electronic control system 7 activated by the accelerator pedal); whereas valve 6 provides for varying air supply to the engine independently of the user, and is especially useful for supplying the engine with additional air at idling speed, startup, or when the vehicle is "braked" by the engine upon release of the accelerator pedal ("dashpot" conditions).

As shown in FIG. 1, electronic control system 7 comprises:

three preprocessing blocks 13, 14, 15 connected to respective sensors 8, 11, 12, and which provide for generating a signal, made available to the other blocks, as a function of the reading of the corresponding sensor;

a reading memory 16 supplied with the signals from blocks 13, 14, 15;

a count memory 17 connected to reading memory 16;

a timing block 18 connected to count memory 17;

a data display control block 21 connected to count memory 17 and a display 22;

a setting data memory 23 connected to count memory 17;

an updatable setting memory 24 connected to count memory 17;

a block 25 for controlling valve 6; and a block 26 for supplying block 25 with a control enabling signal as a function of the signals received from count memory 17 and updatable setting memory 24.

Reading memory 16 stores and updates the readings of sensors 8, 11, 12 at each sampling cycle; count memory 17 calculates the theoretical position to be effected of valve 6; and setting data memory 23 supplies count memory 17 with signals corresponding to first setting parameters, for calculating the theoretical position of valve 6 and hence air flow along conduit 5. Setting data memory 23 also supplies signals, corresponding to second setting parameters differing from those mentioned above, to means inside count memory 17, for analyzing the actual position of valve 6. In actual use, control system 7, or rather its component parts, are calibrated on the basis of a specimen engine; and updatable setting memory 24 provides for determining the difference in the air intake capacity of the specimen and on-vehicle engines, so that all the additional-air control functions are adapted to the on-vehicle engine. In other words, memory 24 provides for varying the reference parameters of the engine. The functions of the various components of control system 7 will be made clearer in the following operating cycle description of system 1.

Figure 2:
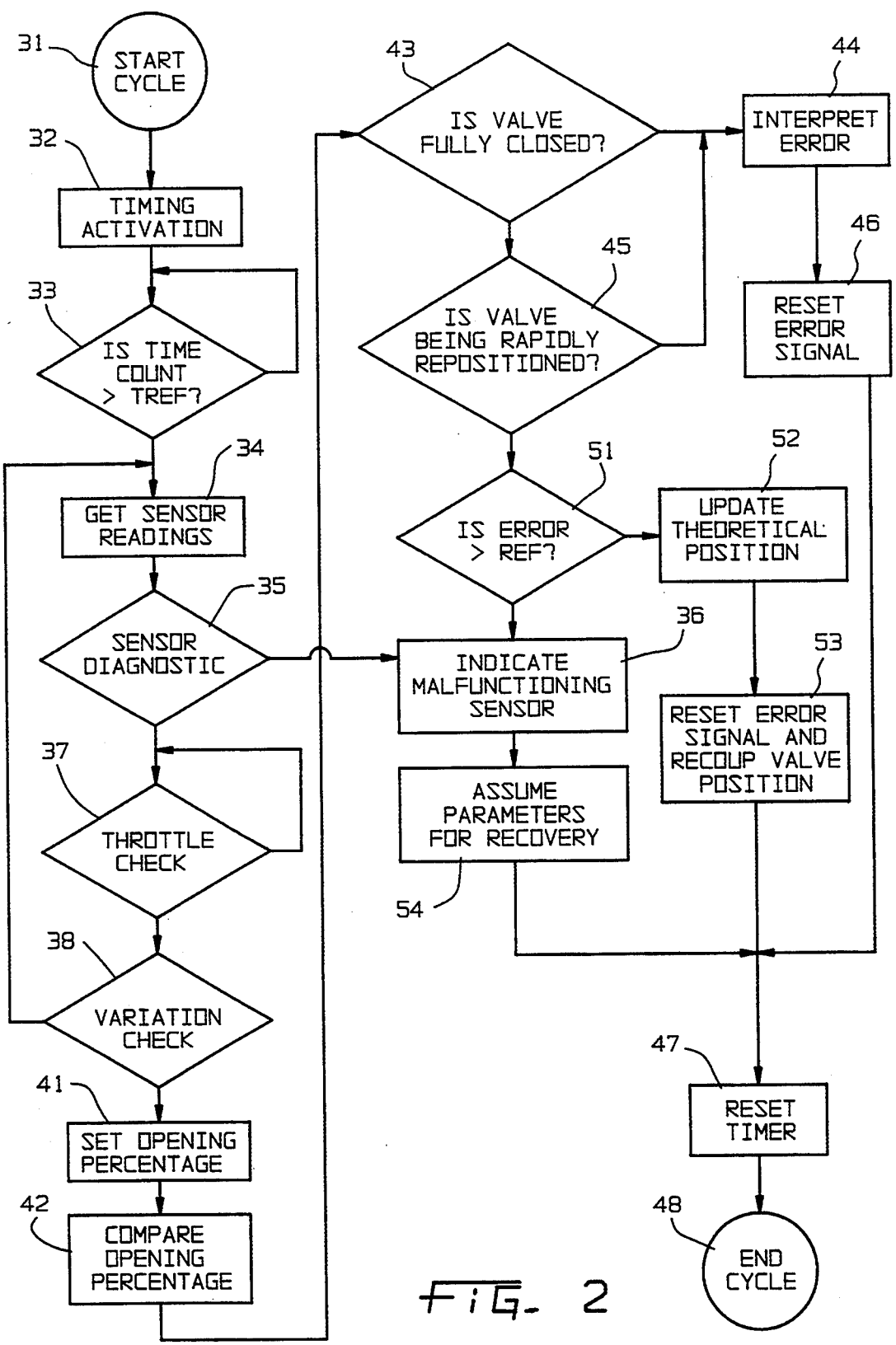
FIG. 2 shows an operating block diagram of the FIG. 1 system.

As shown in FIG. 2, the operating cycle of system 1 comprises a start block 31 which goes on to block 32 for activating timing block 18 and commencing the time count. Block 32 goes on to block 33 which determines whether the time count of block 18 is greater than a predetermined reference time Tref. If it is, block 33 goes on to block 34; if it is not, block 33 goes back to its own input. Block 33 substantially consists of a waiting block. Block 34 provides for determining the engine parameters and more specifically for reading the signals from sensors 8, 11, 12, which are so processed by blocks 13, 14, 15 as to be made "readable" and available to the other blocks in control system 7. Block 34 goes on to block 35 which provides for diagnosing sensors 8, 11, 12. In the event of a fault on even only one of sensors 8, 11, 12, block 35 goes on to block 36; conversely, if all three sensors 8, 11, 12 are operating correctly, block 35 goes on to block 37. As regards the above sensor diagnosing function, it should be pointed out that this is already provided for on vehicle electronic control systems and may thus be employed with no difficulty.

Block 37 provides for determining whether throttle 4 of conduit 3 is in the fully closed position. If it is, block 37 goes on to block 38; if it is not, block 37 goes back to its own input. Block 38 provides for determining whether any variation has been made to the engine parameters in block 34, and, if so, goes back to block 34. Conversely, block 38 goes on to block 41 where count memory 17 fetches from setting data memory 23 the estimated opening percentage value of conduit 5 defined by valve 6 (first parameter generated by memory 23). In setting data memory 23, a map is defined in which each speed of the engine is assigned an estimated opening percentage value of conduit 5, which is none other than the set value of the specimen engine.

Block 41 goes on to block 42 where the estimated opening percentage value of conduit 5 fetched by block 41 is compared with the opening percentage value of conduit 5 contained in count memory 17 and relative to the theoretical position of valve 6 as controlled by block 25. The outcome of the comparison consists in generating an error signal. Block 42 then goes on to block 43 which provides for determining whether valve 6 of conduit 5 is in the fully closed position. If it is, block 43 goes on to block 44; if it is not, block 43 goes on to block 45.

Block 44 interprets the error resulting from the comparison in block 42 as a variation in the intake capacity of the engine as compared with that of the specimen engine, which variation may be caused, for example, by wear-induced slack on the engine components. On the basis of the error signal generated in block 42, block 44 generates an error compensating signal δ, and updates the updatable setting memory 24 so that the intake capacity value of the specimen engine used as the reference value is replaced by a new reference value computed on the basis of the error signal generated in block 42. Block 44 then goes on to block 46 where the error signal generated in block 42 is reset, and where the control signal generated by count memory 17, as a function of the theoretical position of valve 6, and the compensating signal 6 generated by block 44 are sent to block 26.

In block 26, the compensating signal 6 is added algebraically to the control signal generated by count memory 17, so as to generate the actual control enabling signal which is sent to block 25 which in turn provides for controlling valve 6. In other words, compensating signal δ provides for adapting the control signal of valve 6 in relation to that of the specimen engine, so that the actual control enabling signal takes into account any in-service variations in the intake capacity of the engine. Block 46 then goes on to block 47, which resets timer 18, and from there to an end block 48 which goes back to block 31 for the next operating cycle.

Block 45 determines whether valve 6 has been in its current position for less than a predetermined time, and during which it has assumed the maximum closed position of conduit 5. In other words, block 45 determines whether the current position of valve 6 is the result of rapidly repositioning the valve with respect to the maximum position. In the event of a positive response, block 45 goes on to block 44; conversely, block 45 goes on to block 51.

Block 51 determines whether the value of the error signal generated in block 42 is above a predetermined reference value. If so, block 51 goes on to block 36; conversely, block 51 goes on to block 52 which updates the theoretical position of valve 6 in count memory 17 with a new theoretical position (second parameter generated by memory 23) computed on the basis of the error signal and so closer to the real position of valve 6. Block 52 then goes on to block 53 and from there to block 47. In block 53, the error signal is reset, and count memory 17 generates a control enabling signal computed on the basis of the updated theoretical position of valve 6. In other words, block 53 provides for recouping any discrepancy between the theoretical position of valve 6, computed by count memory 17 and estimated on the basis of the control enabling signal generated by memory 17, and the actual physical position of valve 6 estimated on the basis of the readings of sensors 8, 11, 12. Control system 7 thus monitors any aging-induced variation in the air intake capacity of the engine, and system 1 adapts to said variations by first replacing the reference values of the specimen engine with those of the on-vehicle engine, and then progressively replacing the on-vehicle engine reference values with more updated ones.

Block 36 provides for controlling block 21 and indicating, on display 22, any malfunctioning of one or more sensors 8, 11, 12, which indication may be controlled on the basis of the diagnosis performed in block 35, i.e. actual detection of a fault on the sensors, or by interpreting as a fault on the sensors an error signal above said predetermined reference value in block 51. Block 36 goes on to block 54 and from there to block 47. Block 54 provides for assuming parameters relative to a recovery speed at which the engine may function.

The advantages of the present invention are as follows.

In particular, it provides for more accurately regulating the additional air intake of the engine, thus providing for more accurate data processing of functions in which the additional air supply value is used as a parameter, as well as for improving performance of the engine. Moreover, the control system governing regulation of the additional air supply is capable of adapting it to the on-vehicle engine as opposed to the set values of a specimen engine, thus providing for production advantages in that the control system need no longer be adjusted to each individual engine installed. An important point to note is that the control system provides for monitoring aging-induced variations in the air intake capacity of the engine, so that system 1 adapts to said variations by first replacing the reference values of the specimen engine with those of the on-vehicle engine, and then progressively replacing the on-vehicle engine reference values with more updated ones. Finally, system 1 also provides for diagnosing and informing the user of any malfunctioning of sensors 8, 11, 12.

It will be clear that changes may be made to system 1 as described and illustrated herein without, however, departing from the scope of the present invention.

In particular, provision may be made for diagnosing the actual adjustment effected by valve 6, for indicating, on display 22, any malfunctioning of valve 6 itself; and, as opposed to determining closure of throttle 4 (block 37), it is possible to determine, by means of sensor 11, the total air intake and subtract from this the air intake through throttle 4, calculated on the basis of the angular position of the throttle as determined by sensor 12.

The FIG. 2 operating cycle of system 1 provides for feedback control of throttle 4 which is essential for determining the angular position of throttle 4 in block 37. In the absence of feedback control of throttle 4, i.e. in the absence of sensor 12, block 37 is replaced by three blocks in succession, of which the first provides for setting the throttle to the fully closed position, the second for controlling the reading defined by sensor 11, and the third for restoring throttle 4 to its former position. The third block then goes on to block 43, and blocks 38, 41 and 42 are interposed between blocks 43 and 44, and between blocks 43 and 45, so that, by comparing the signal of sensor 11 in block 34 with that in the second block described above, it is possible to calculate the distribution of the air flow along conduit 5 and along the conduit at throttle 4.

We claim:

1. An internal combustion engine air intake regulating system comprising an air intake manifold, including a main conduit, a first air supply regulating valve associated with said main conduit, a bypass conduit having an inlet and outlet in communication with said main conduit and respectively upstream and downstream from said first valve, and a second air supply regulating valve associated with said bypass conduit; means for controlling said second valve; a first sensor for detecting the speed of the engine; a second sensor for detecting the amount of air supply by the engine; a third sensor for detecting the position of said first valve; and first means for generating a control signal for said second valve dependent on engine speed; said regulating system further comprising:

second means for determining and storing the theoretical position of said second valve dependent on engine speed;

third means for determining and storing the position of said second valve following performance of a command by said first means, which position is estimated dependent on readings of said first, second, and third sensors;

fourth means for comparing said theoretical position and said estimated position, and generating an error signal; and fifth means for varying the control signal of said second valve, generated by said first processing means, dependent on said error signal.

2. A system as claimed in claim 1 wherein said regulating system comprises an electronic control system which includes:

preprocessing means connected to said sensors, for generating a signal dependent on readings of said sensors and for communicating said signal within said electronic control system;

a reading memory which receives signals from said preprocessing means, stores readings of said sensors, and updates readings at each sampling cycle;

a count memory connected to said reading memory and which calculates the theoretical position to be effected of said second valve;

a setting data memory connected to said count memory, and which communicates to said count memory with signals corresponding to first setting parameters determined from a specimen engine, for computing the theoretical position of said second valve; and which communicates to said third means defined in said count memory with signals corresponding to second setting parameters determined from readings of said sensors;

an updatable setting memory connected to said count memory and which determines the difference in the air intake capacity of a specimen engine and an on-vehicle engine, so that all the additional-air control functions are adapted to the on-vehicle engine; and means for communicating to said control means with a control enabling signal dependent on signals received from said count memory and said updatable setting memory.

3. A system as claimed in claim 2 further comprising means for replacing an intake reference value the error signal.

4. A system as claimed in claim 2 wherein said control system comprises timing means connected to said count memory; and data display control means connected to said count memory and to a display for indicating any faults on said sensors.

5. A system as claimed in claim 4 further comprising means for comparing the value of the error signal with a predetermined reference value; and for so controlling said display as to indicate a fault on one or more of said sensors in the event the error signal value is above said predetermined reference value.

6. A system as claimed in claim 5 further comprising means for diagnosing operation of said second valve; said display adapted to indicate the presence of a fault on said second valve.

* * * * *

UNITED STATES PATENT AND TRADEMARK OFFICE
CERTIFICATE OF CORRECTION

PATENT NO. : 5,427,081
DATED : June 27, 1995
INVENTOR(S) : Giorgio Bombarda et al It is certified that error appears in the above-indentified patent and that said Letters Patent is hereby corrected as shown below:

Claim 3, column 6, line 67, after "value" insert

--by a new reference value calculated on--.

Signed and Sealed this

Nineteenth Day of September, 1995

BRUCE LEHMAN

Attest:

Attesting Officer     Commissioner of Patents and Trademarks